United States Patent
Morgenstern et al.

(10) Patent No.: US 10,552,326 B2
(45) Date of Patent: *Feb. 4, 2020

(54) REDUCING CACHE THRASHING FOR COUNTS IN HOT CACHE LINES

(71) Applicant: International Business Machines Corporation, Armonk, NY (US)

(72) Inventors: Harris M. Morgenstern, Wappingers Falls, NY (US); Steven M. Partlow, Beacon, NY (US); Christopher L. Wood, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/602,897

(22) Filed: May 23, 2017

(65) Prior Publication Data

US 2018/0341589 A1 Nov. 29, 2018

(51) Int. Cl.
*G06F 12/0844* (2016.01)
*G06F 11/34* (2006.01)

(52) U.S. Cl.
CPC ...... *G06F 12/0844* (2013.01); *G06F 11/3466* (2013.01); *G06F 2201/885* (2013.01);
(Continued)

(58) Field of Classification Search
CPC ............. G06F 12/0844; G06F 12/0815; G06F 2212/1008; G06F 11/3466; G06F 2212/1021; G06F 2201/885
See application file for complete search history.

(56) References Cited

U.S. PATENT DOCUMENTS

2003/0142725 A1* 7/2003 Keller ............... H04J 13/107
375/140
2006/0036810 A1 2/2006 Accapadi
(Continued)

FOREIGN PATENT DOCUMENTS

JP 2012059131 A * 3/2012

OTHER PUBLICATIONS

Anonymous; "An IP.com Prior Art Database Technical Disclosure"; IP.com No. IPCOM000240105D; Jan. 2, 2015; 4 pages.
(Continued)

*Primary Examiner* — David Yi
*Assistant Examiner* — Alan Otto
(74) *Attorney, Agent, or Firm* — Cantor Colburn LLP; William Kinnaman

(57) ABSTRACT

Provided herein is a computer-implemented method. The computer-implemented method includes updating, by a processor, a value of a delta field of an entry of a data structure indexed for the processor. The computer-implemented method also includes comparing, by the processor, a predefined threshold for a global field corresponding to the delta field and the value of the delta field. The computer-implemented method also includes rolling, by the processor, the value of the delta field into the global field when an absolute value of the value of the delta field meets or exceeds the predefined threshold for the global field. Note that the data structure is stored in a first area of a memory in communication with the processor that is separate from a second area of the memory storing the global field.

10 Claims, 6 Drawing Sheets

(52) U.S. Cl.
CPC ............ *G06F 2212/1008* (2013.01); *G06F 2212/1021* (2013.01)

(56) References Cited

U.S. PATENT DOCUMENTS

| | | | |
|---|---|---|---|
| 2006/0080506 A1* | 4/2006 | Rajamony | G06F 12/0813 711/119 |
| 2008/0247641 A1* | 10/2008 | Rasmusson | G06T 11/40 382/166 |
| 2013/0125127 A1 | 5/2013 | Mital | |
| 2018/0341590 A1 | 11/2018 | Morgenstern et al. | |

OTHER PUBLICATIONS

Anonymous; "Method for Hardware Prefetching of the Structured Data of Cache Miss Loads"; IP.com No. IPCOM000127016D; Aug. 17, 2005; 8 pages.

Anonymous; "Reducing Cache Interference by Low Priority (Performance-Insensitive) Partitions in Highly Virtualized Environments"; IP.com No. IPCOM000229327D; Jul. 22, 2013; 3 pages.

List of IBM Patents or Patent Applications Treated as Related; (Appendix P), filed Nov. 13, 2017, 2 pages.

Harris M. Morgenstern et al., "Reducing Cache Thrashing for Counts in Hot Cache Lines", U.S. Appl. No. 15/810,284, filed Nov. 13, 2017.

\* cited by examiner

REDUCING CACHE THRASHING FOR COUNTS IN HOT CACHE LINES

BACKGROUND

The disclosure relates generally to reducing cache thrashing for counts in hot cache lines.

In contemporary implementations of counts in globally accessible storage of a computer, a problem exists where some of the counts are updated frequently by multiple processors of the computer. That is, each time a processor desires to update a count, that processor must obtain update access to a cache line containing that count. When multiple processors frequently desire to obtain update access to a cache line, that cache line is then frequently passed between processor and cache misses ensue. Cache misses are expensive to resolve in terms of performance of the computer. In addition, cache misses and the resulting performance issues are exacerbated when multiple counts exist within the same cache line.

SUMMARY

According to one or more embodiments, a computer-implemented method is provided. The computer-implemented method includes updating, by a processor, a value of a delta field of an entry of a data structure indexed for the processor. The computer-implemented method also includes comparing, by the processor, a predefined threshold for a global field corresponding to the delta field and the value of the delta field. The computer-implemented method also includes rolling, by the processor, the value of the delta field into the global field when an absolute value of the value of the delta field meets or exceeds the predefined threshold for the global field. Note that the data structure is stored in a first area of a memory in communication with the processor that is separate from a second area of the memory storing the global field.

According to one or more embodiments, a computer-implemented method can be implemented as a computer program product and/or a system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In view of the above, embodiments disclosed herein may include system, method, and/or computer program product (herein a system) that provides a separate area of storage with entries associated with each processor of the system into which one or more deltas from original global counts are stored. Embodiments described herein are necessarily rooted in the system (comprising at least a processor and a memory) to perform proactive operations to overcome problems specifically arising in the realm of contemporary implementations of counts (e.g., these problems include the cache misses, resulting in unwanted performance issues).

In an operation example, instead of updating global counts in a centralized area every time a change occurs as in done in the contemporary implementations of counts, the system utilizes a first entry of the separate area that only a first processor can reference to store a delta. The delta in the first entry is updated/incremented until an absolute value of the delta reaches a predefined threshold. For example, if a count is updated/incremented four (4) times by the first processor, the delta within the first entry will reflect the four (4) changes (while a corresponding global count within a global field corresponding to the first entry will remain static). When the predefined threshold is reached, the delta is added to the global count in the centralized storage. Based on this operation, the processors of the system avoid constantly accessing the centralized areas each time a count experience a change. Thus, the technical effects and benefits of the embodiments described herein include modifying global fields less frequently than the contemporary implementations of counts, thereby resulting in fewer cache misses.

Figure 1:
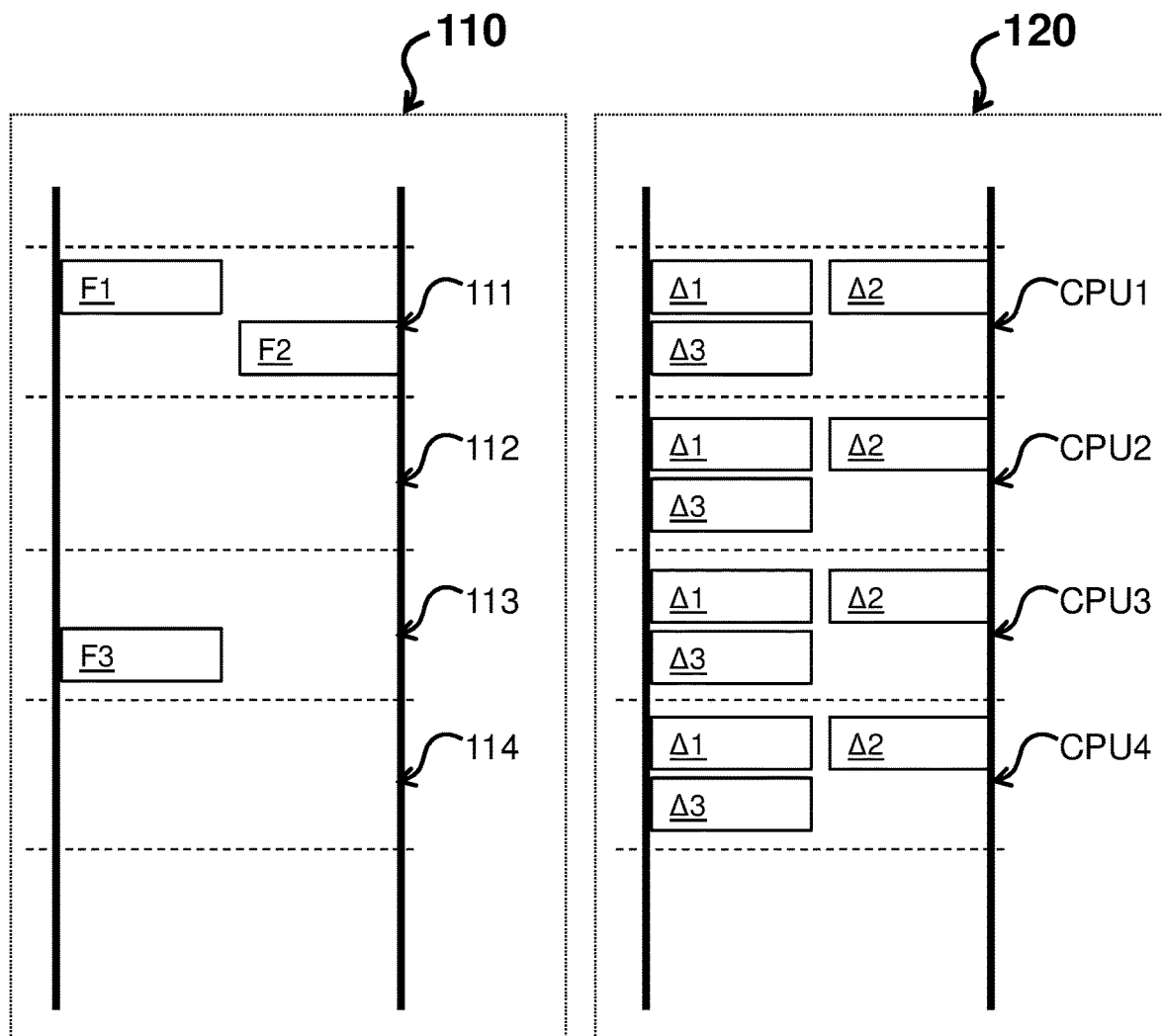
FIG. 1 depicts a system in accordance with one or more embodiments.

Turning now to FIG. 1, storage areas 110 and 120 of a memory of the system are generally shown in accordance with one or more embodiments. Note that the system can be an electronic, computer framework comprising and/or employing any number and combination of computing devices and networks utilizing various communication technologies, as described herein. The system can be easily scalable, extensible, and modular, with the ability to change to different services or reconfigure some features independently of others. An example of the system in accordance with one or more embodiments is described further with respect to FIG. 6.

The storage area 110 is a centralized area (e.g., global storage) where instrumentation counts are stored and managed within main or global fields. The main or global fields reside within one or more cache lines 111, 112, 113, and 114 that are accessed by one or more processors (also referred to as central processing units (CPU(s))). The one or more cache lines 111, 112, 113, and 114 are represented by the space between the horizontal dashed lines. Examples of global fields of the storage area 110 comprise a global field F1, a global field F2, and a global field F3. Note that the global field F1 and the global field F2 reside within the same cache line 111. For each global field Fn, there is also a predefined threshold value Tn that defines a value at which a delta for any CPU should be added back into the global count. In another embodiment, a value of the predefined threshold Tn can be a formula, such as a percentage (e.g., 1%) of the value in the global field Fn or based on a number of other fields, so accuracy can be on a percentage basis or made to become more accurate in certain conditions. Note that other formulas can be utilized in conjunction with or in the alternative to the formal (such as a how close the count is to another count, which is useful for accuracy as a first approaches a second count; such as when an area is considered full.

The storage area 120, which is separate from the storage area 110, is an area (e.g., CPU-related storage) where a data structure, such as a table, is stored and managed. The data structure is on a cache line boundary, and each entry resides within its own cache line (or multiple thereof). The data structure comprises an entry for each defined CPU. The CPU id number is used to index each entry. As shown in FIG. 1, the data structure includes four (4) entries corresponding to four (4) CPUs, i.e., CPU1, CPU2, CPU3, and CPU4. Only the CPU with which an entry is associated loads its corresponding block into the read-only or read-write cache of that CPU (Note that while the CPU-related storage may not always be in the read/write cache of a current CPU, it will never be in the cache of any other CPU). Within each entry, one or more delta fields containing deltas relative to global counts are provided. As shown in FIG. 1, each entry includes three (3) delta fields 41, 42, and 43 that respectively correspond to the global field F1, the global field F2, and the global field F3.

Operational embodiments of the system are described with respect to FIGS. 2-5, in view of the following notes regarding the contemporary implementations of counts. During contemporary operations, as code instances run on different software engines of the system, each software engine can increment and/or decrement each corresponding global count within its respective global field. The result is that the global counts are thrashed between processor caches (of processors running the software engines) every time the multiple software engines increment and/or decrement the global counts. Such a volume of processor cache thrashing raises cache miss probabilities for the contemporary implementations of counts. In contrast, operational embodiments of the system can exploit certain instrumentation counts that do not require strict or exact values. That is, the system can avoid high volume processor cache thrashing but utilizing close approximations of certain instrumentation counts within a tolerance is acceptable.

Figure 2:
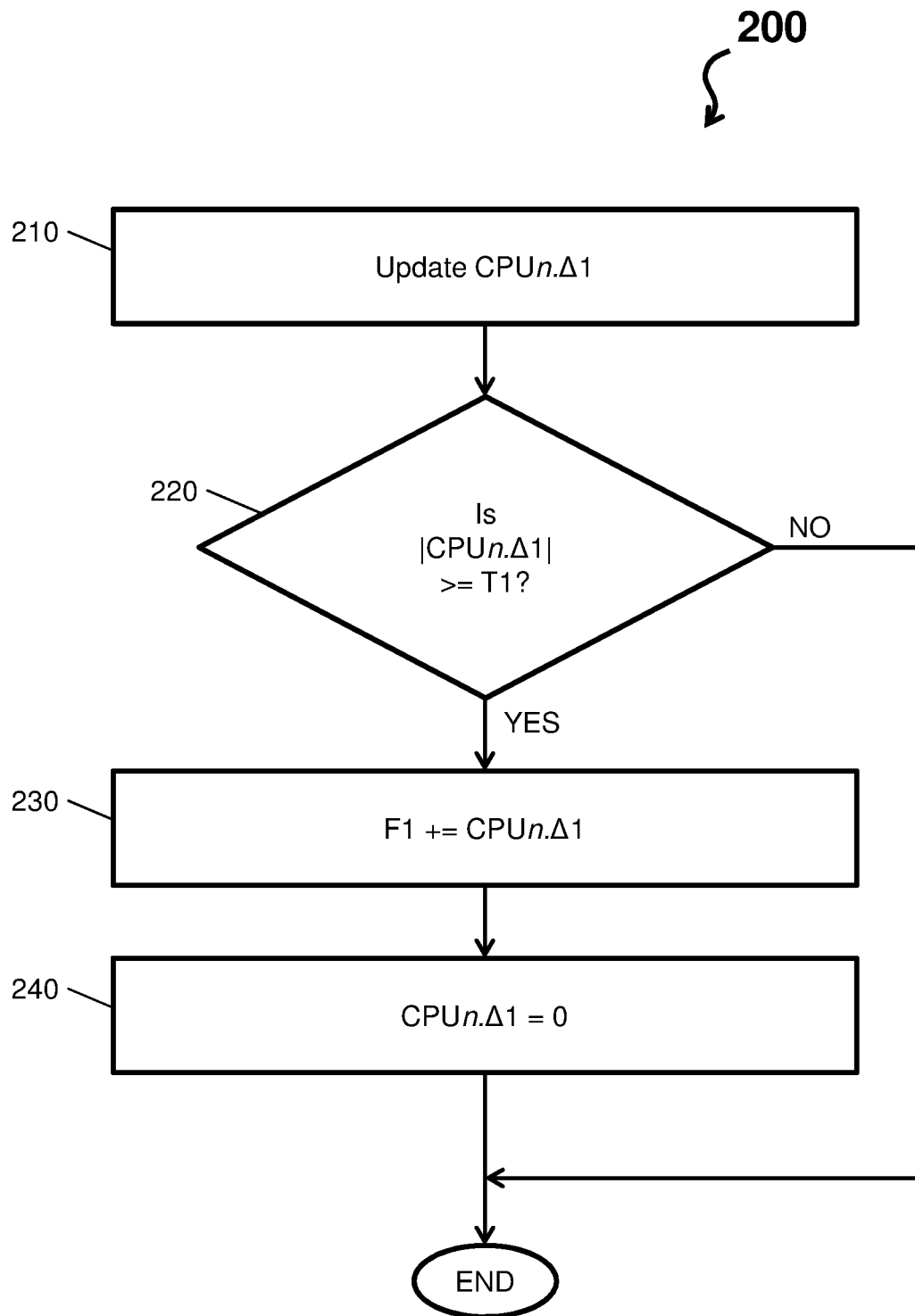
FIG. 2 depicts a process flow of system in accordance with one or more embodiments.

Turning now to FIG. 2, a process flow 200 of the system is depicted in accordance with one or more embodiments. The process flow 200 begins at block 210, where the system updates deltas within the data structure of the storage area 120 when the global counts would normally be updated, instead of updating the global counts of the global fields F1, F2, and F3. For example, a first processor updates the delta field Δ1 of an entry of the data structure indexed for CPU1 (e.g., Update CPUn.Δ1).

At decision block 220, after updating the delta field Δ1, a value of the delta field Δ1 (e.g., the delta itself) is compared to a predefined threshold T1 for the global field F1 (e.g., Is |CPUn.Δ1|>=T1?). If an absolute value of the delta meets or exceeds the predefined threshold T1 for the global field F1, then the process flow 200 proceeds to block 230 as shown by the YES arrow. At block 230, the delta itself is added to the global count stored within the global field (e.g., F1+=CPUn.Δ1; the delta is rolled into the global field F1). At block 240, the value of the delta field Δ1 is reset to zero (e.g., CPUn.Δ1=0). Then the process flow 200 ends.

Returning to decision block 220, if the predefined threshold T1 has not been reached, no further processing is required and the process flow 200 proceeds to end as shown by the NO arrow. Further, a storage access of the global field F1 is not required by the first processor. Then the process flow 200 ends. Note that, during this processing, the global field F1 must be locked so that the execution of the process flow 200 is not interrupted or global count is not re-dispatched on a different processor.

The process flow 200, in contrast the contemporary implementations of counts, modifies the global field F1 much less frequently (e.g., a reduction in cache thrashing) resulting in fewer cache misses since the cache line containing the global count is never accessed when the predefined threshold T1 has not been exceeded. For instance, if the delta is incremented by one (1) and the predefined threshold T1 for that delta is five (5), then the global field F1 is updated one (1) time out of five (5), potentially resulting a cache miss reduction of 80% for that global field F1. Note that the predefined threshold T1 being five (5) can potentially provide better than an 80% cache miss reduction when the values within the delta fields are incremented and decremented because it is possible to have many adjustments before hitting the predefined threshold T1. Further, in the case where multiple global counts are contained within multiple global fields of the same cache line (e.g., global field F1 and global field F2), all global counts can be updated in that cache line when one global field is accessed.

Figure 3:
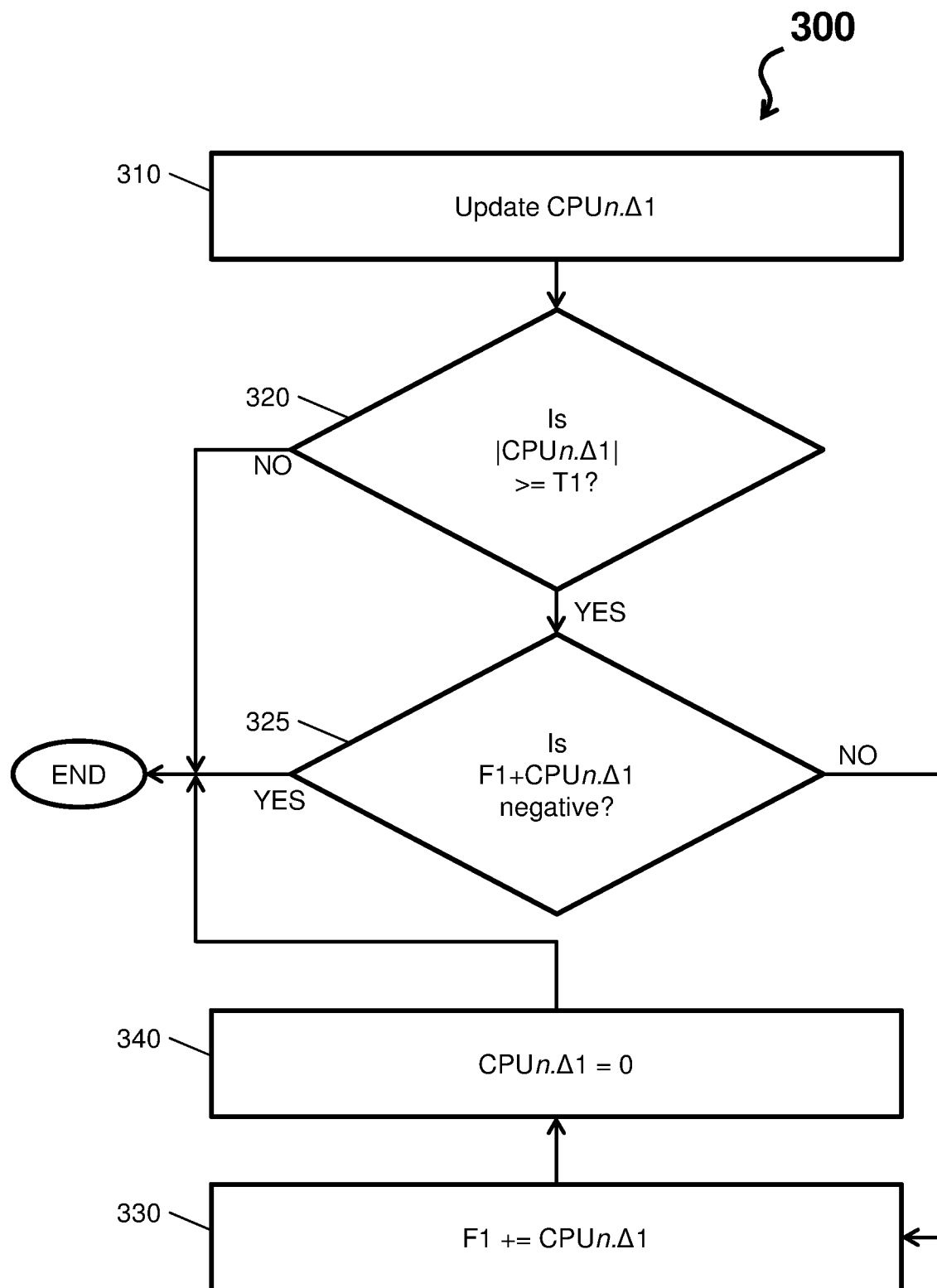
FIG. 3 depicts a process flow of system in accordance with one or more embodiments.

Turning now to FIG. 3, a process flow 300 of the system is depicted in accordance with one or more embodiments. The process flow 300 describes a case where a negative value is never permitted into a global field (as the negative value can be interpreted as an error or as a large positive number). In these cases an additional check is performed. Thus, the process flow 300 begins at block 310, where the system updates deltas within the data structure of the storage area 120 when the global counts would normally be updated, instead of updating the global counts of the global fields F1, F2, and F3. For example, a first processor updates the delta field Δ1 of an entry of the data structure indexed for CPU1 (e.g., Update CPUn.Δ1).

At decision block 320, after updating the delta field Δ1, a value of the delta field Δ1 (e.g., the delta itself) is compared to a predefined threshold T1 for the global field F1 (e.g., Is |CPUn.Δ1|>=T1?). If the predefined threshold T1 has not been reached, no further processing is required and the process flow 300 proceeds to end as shown by the NO arrow. If an absolute value of the delta meets or exceeds the predefined threshold T1 for the global field F1, then the process flow 300 proceeds to decision block 325 as shown by the YES arrow.

At decision block 325, the system determines whether a resulting global count from adding a value of the global field F1 and the value of the delta field Δ1 would be negative (e.g., Is F1+CPUn.Δ1 negative?). If the value to be stored into the global field F1 is less than zero, the delta itself is not merged into the global field F1 and the process flow 300 proceeds to end as shown by the YES arrow. If the value to be stored into the global field F1 is not less than zero, the delta itself can be merged into the global field F1 and the process flow 300 proceeds to block 330 as shown by the NO arrow.

At block 330, the delta itself is added to the global count stored within the global field F1 (e.g., F1+=CPUn.Δ1; the delta is rolled into the global field F1). At block 340, the value of the delta field Δ1 is reset to zero (e.g., CPUn.Δ1=0). Then the process flow 300 ends.

Figure 4:
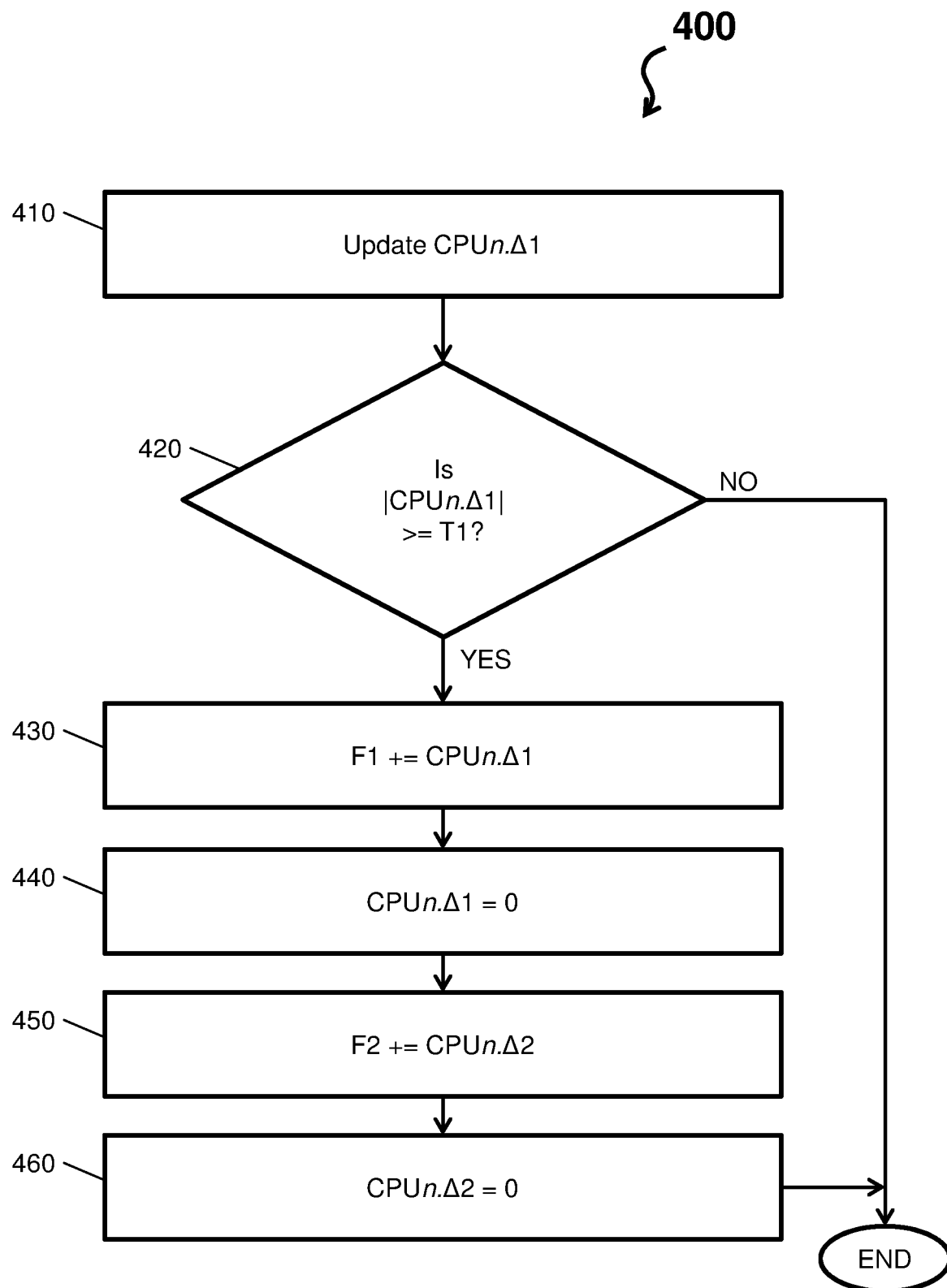
FIG. 4 depicts a process flow of system in accordance with one or more embodiments.
Figure 5:
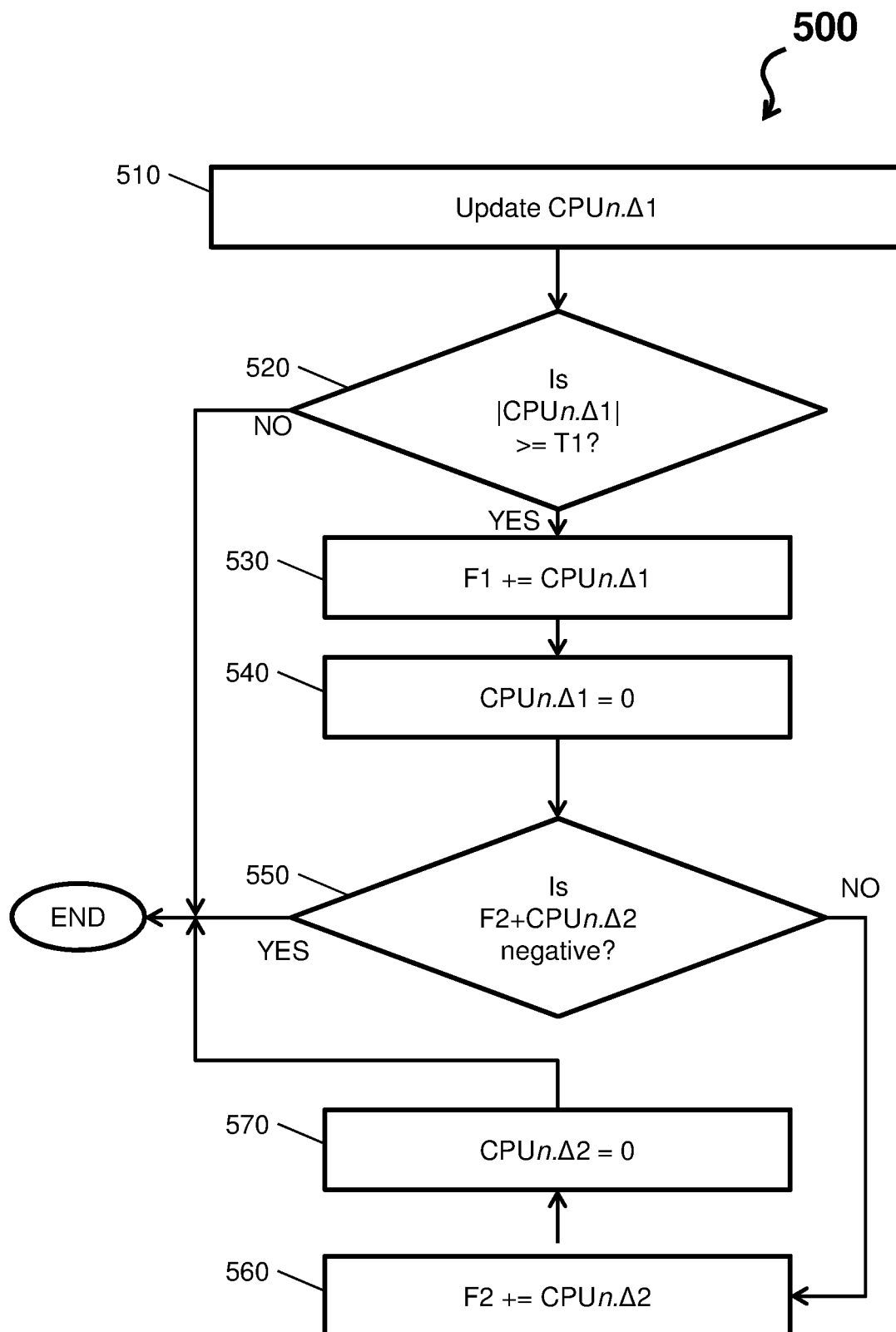
FIG. 5 depicts a process flow of system in accordance with one or more embodiments.

Turning now to FIGS. 4-5, additional optimization is achieved when multiple global counts are stored in the same cache line. That is, since the cache line containing the global field whose threshold was exceeded is being obtained, additional performance benefits may be realized by updating all of the global counts in that cache line with the deltas from this CPU, regardless of whether the threshold has been exceeded for that count. Note that although the descriptions herein depict examples where there are two fields in a cache line, a number of fields can be more than two and the examples herein are limited only by the number of fields that will fit in the cache line. Further, when there are multiple fields in the cache line, some of those fields may need to check for negative values while others may not (these checks can be independent of each other).

FIG. 4 depicts a process flow 400 of a system in accordance with one or more embodiments. The process flow 400 begins at block 410, where a first processor updates the delta field Δ1 of an entry of the data structure indexed for CPU1 (e.g., Update CPUn.Δ1). At decision block 420, after updating the delta field Δ1, a value of the delta field Δ1 (e.g., the delta itself) is compared to a predefined threshold T1 for the global field F1 (e.g., Is |CPUn.Δ1|>=T1?). If an absolute value of the delta meets or exceeds the predefined threshold T1 for the global field F1, then the process flow 400 proceeds to block 430 as shown by the YES arrow. At block 430, a value of the delta field Δ1 of CPU1 is rolled into the global field F1 (e.g., F1+=CPUn.Δ1; a). At block 440, the value of the delta field Δ1 is reset to zero (e.g., CPUn.Δ1=0). At block 450, a value of the delta field Δ2 of CPU1 is rolled into the global field F2 (e.g., F2+=CPUn.Δ2). At block 460, the value of the delta field Δ2 is reset to zero (e.g., CPUn.Δ1=0). Then the process flow 400 ends. Returning to decision block 420, if the predefined threshold T1 has not been reached, no further processing is required and the process flow 400 proceeds to end as shown by the NO arrow.

FIG. 5 depicts a process flow 500 of a system in accordance with one or more embodiments. The process flow 500 begins at block 510, where a first processor updates the delta field Δ1 of an entry of the data structure indexed for CPU1 (e.g., Update CPUn.Δ1). At decision block 520, after updating the delta field Δ1, a value of the delta field Δ1 (e.g., the delta itself) is compared to a predefined threshold T1 for the global field F1 (e.g., Is |CPUn.Δ1|>=T1?). If the predefined threshold T1 has not been reached, no further processing is required and the process flow 500 proceeds to end as shown by the NO arrow. If an absolute value of the delta meets or exceeds the predefined threshold T1 for the global field F1, then the process flow 500 proceeds to block 530. In one or more embodiments, the process flow 500 can check if either F1 and/or F2 are negative. At block 530, a value of the delta field Δ1 of CPU1 is rolled into the global field F1 (e.g., F1+=CPUn.Δ1; a). At block 540, the value of the delta field Δ1 is reset to zero (e.g., CPUn.Δ1=0). The system next moves on to update the remaining global fields (e.g., the remaining global field F2 of cache line 111).

At decision block 550, the system determines whether a resulting global count from adding a value of the global field F2 and the value of the delta field Δ2 of CPU1 would be negative (e.g., Is F2+CPUn.Δ1 negative?). If the value to be stored into the global field F2 is less than zero, the delta itself is not merged into the global field F2 and the process flow 500 proceeds to end as shown by the YES arrow. If the value to be stored into the global field F2 is not less than zero, the delta itself can be merged into the global field F2 and the process flow 500 proceeds to block 560 as shown by the NO arrow.

At block 560, a value of the delta field Δ2 of CPU1 is rolled into the global field F2 (e.g., F2+=CPUn.Δ2). At block 570, the value of the delta field Δ2 is reset to zero (e.g., CPUn.Δ1=0). Then the process flow 500 ends. Returning to decision block 720, if the predefined threshold T1 has not been reached, no further processing is required and the process flow 500 proceeds to end as shown by the NO arrow.

Figure 6:
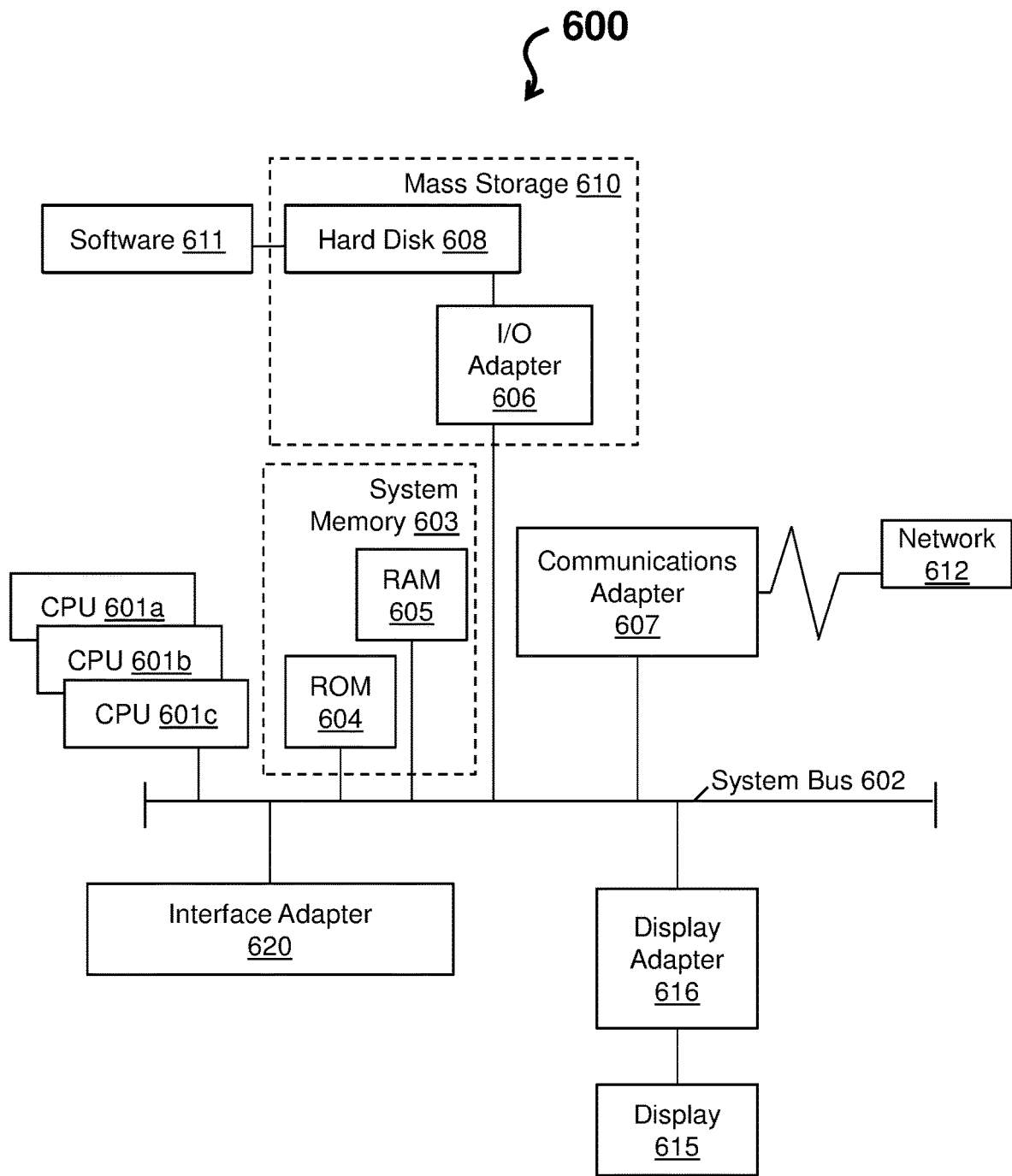
FIG. 6 depicts a system in accordance with one or more embodiments.

FIG. 6 depicts an example of a system 600 in accordance with one or more embodiments. The system 600 has one or more central processing units (CPU(s)) 601a, 601b, 601c, etc. (collectively or generically referred to as processor(s) 601). The processors 601, also referred to as processing circuits, are in communication with via a system bus 602 to system memory 603 and various other components. The system memory 603 can include a read only memory (ROM) 604 and a random-access memory (RAM) 605. The ROM 604 is coupled to the system bus 602 and may include a basic input/output system (BIOS), which controls certain basic functions of the system 600. The RAM is read-write memory coupled to the system bus 602 for use by the processors 601.

FIG. 6 further depicts an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610. A software 611 for execution on the system 600 may be stored in the mass storage 610. The mass storage 610 is an example of a tangible storage medium readable by the processors 601, where the software 611 is stored as instructions for execution by the processors 601 to cause the system 600 to operate, such as is described herein with reference to FIGS. 2-5. Examples of computer program product and the execution of such instruction is discussed herein in more detail. Referring again to FIG. 6, a communications adapter 607 interconnects the system bus 602 with a network 612, which may be an outside network, enabling the system 600 to communicate with other such systems. A display (e.g., screen, a display monitor) 615 is connected to the system bus 602 by a display adapter 616, which may include a graphics controller to improve the performance of graphics intensive applications and a video controller. In one embodiment, the adapters 606, 607, and 616 may be connected to one or more I/O buses that are connected to the system bus 602 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 602 via an interface adapter 620 and the display adapter 616. A keyboard, a mouse, a speaker, etc. can be interconnected to the system bus 602 via the interface adapter 620, which may include, for example, a Super I/O chip integrating multiple device adapters into a single integrated circuit.

Thus, as configured in FIG. 6, the system 600 includes processing capability in the form of the processors 601, and, storage capability including the system memory 603 and the mass storage 610, input means such as the keyboard and the mouse, and output capability including the speaker and the display 615. In one embodiment, a portion of the system memory 603 and the mass storage 610 collectively store an operating system, such as the z/OS or AIX operating system from IBM Corporation, to coordinate the functions of the various components shown in FIG. 6.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions for reducing cache thrashing embodied therewith, the program instructions executable by a processor to cause the processor to:
    update a value of a delta field of an entry of a data structure indexed for the processor;
    compare a predefined threshold for a global field corresponding to the delta field and the value of the delta field;
    roll the value of the delta field into the global field when an absolute value of the value of the delta field exceeds the predefined threshold for the global field,
    wherein a global count of the global field is not accessed when the predefined threshold is not exceeded to reduce the cache thrashing,
    wherein the data structure is stored in a first area of a memory in communication with the processor that is separate from a second area of the memory storing the global field,
    determine whether a resulting global count from adding a value of the global field and the value of the delta field would be negative; and
    merge the value of the delta field into the global field when the resulting global count is not less than zero, wherein the value of the delta field is not merged into the global field when the value of the delta field is less than zero to reduce the cache thrashing.

2. The computer program product of claim 1, wherein the program instructions are further executable by the processor to cause the processor to:
    reset the value of the delta field to zero after rolling the value of the delta field into the global field.

3. The computer program product of claim 1, wherein the program instructions are further executable by the processor to cause the processor to:
    when the global field shares a cache line with at least one additional global field, roll the value of the delta field into the at least one additional global field.

4. The computer program product of claim 3, wherein the program instructions are further executable by the processor to cause the processor to:
    reset the value of the delta field to zero after rolling the value of the second delta field into the second global field.

5. The computer program product of claim 1, wherein a value of the predefined threshold comprises a percentage of a value in the global field.

6. A system comprising a processor and a memory storing program instructions for reducing cache thrashing thereon, the program instructions executable by a processor to cause the system to:
    update a value of a delta field of an entry of a data structure indexed for the processor;
    compare a predefined threshold for a global field corresponding to the delta field and the value of the delta field;
    roll the value of the delta field into the global field when an absolute value of the value of the delta field exceeds the predefined threshold for the global field,
    wherein a global count of the global field is not accessed when the predefined threshold is not exceeded to reduce the cache thrashing,
    wherein the data structure is stored in a first area of a memory in communication with the processor that is separate from a second area of the memory storing the global field,
    determine whether a resulting global count from adding a value of the global field and the value of the delta field would be negative; and
    merge the value of the delta field into the global field when the resulting global count is not less than zero, wherein the value of the delta field is not merged into the global field when the value of the delta field is less than zero to reduce the cache thrashing.

7. The system of claim 6, wherein the program instructions are further executable by the processor to cause the system to:
    reset the value of the delta field to zero after rolling the value of the delta field into the global field.

8. The system of claim 6, wherein the program instructions are further executable by the processor to cause the system to:
    when the global field shares a cache line with at least one additional global field, rolling the value of the delta field into the at least one additional global field.

9. The system of claim 8, wherein the program instructions are further executable by the processor to cause the system to:
    reset the value of the delta field to zero after rolling the value of the second delta field into the second global field.

10. The system of claim 6, wherein a value of the predefined threshold comprises a percentage of a value in the global field.

* * * * *